United States Patent Office 2,733,392
Patented Jan. 31, 1956

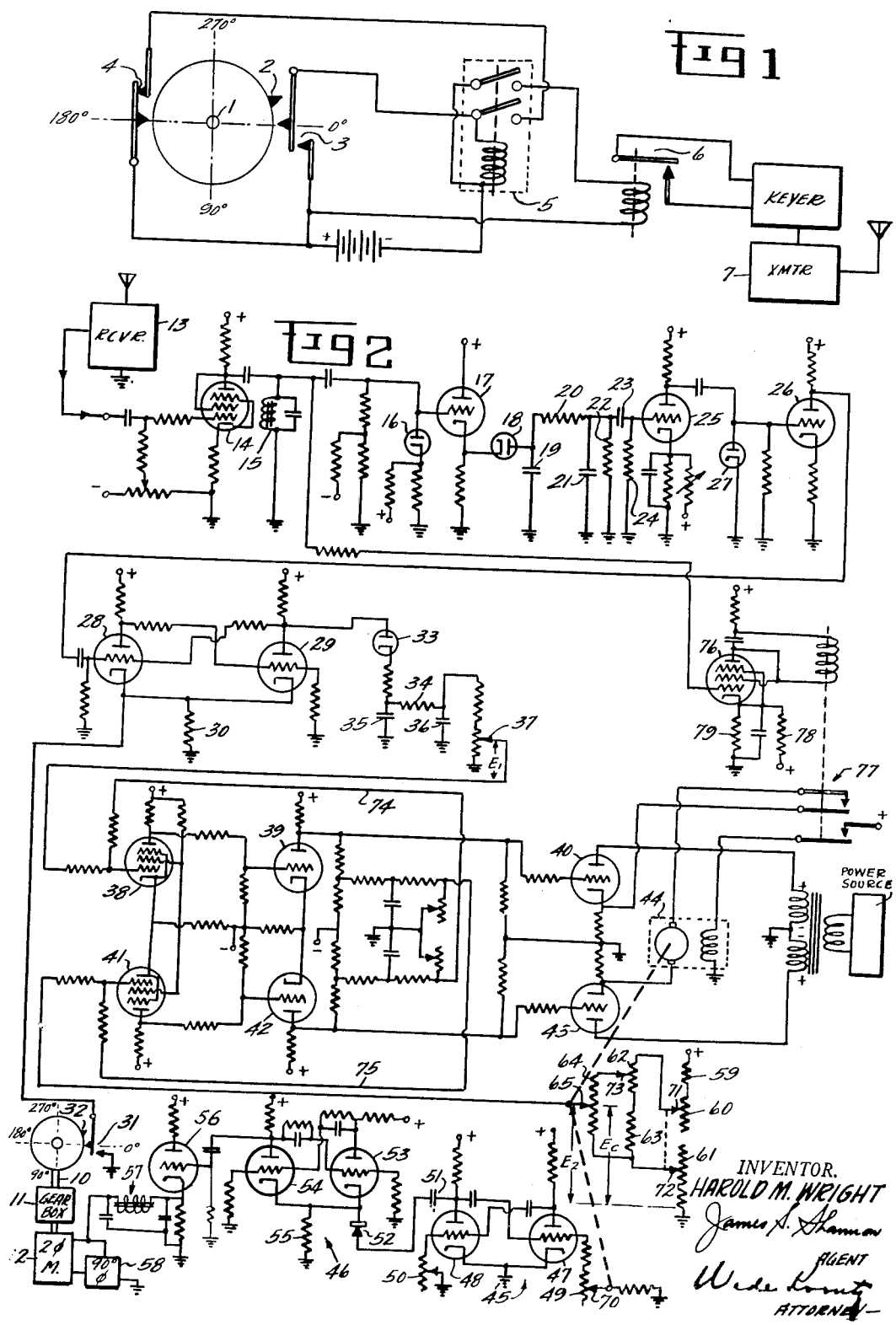

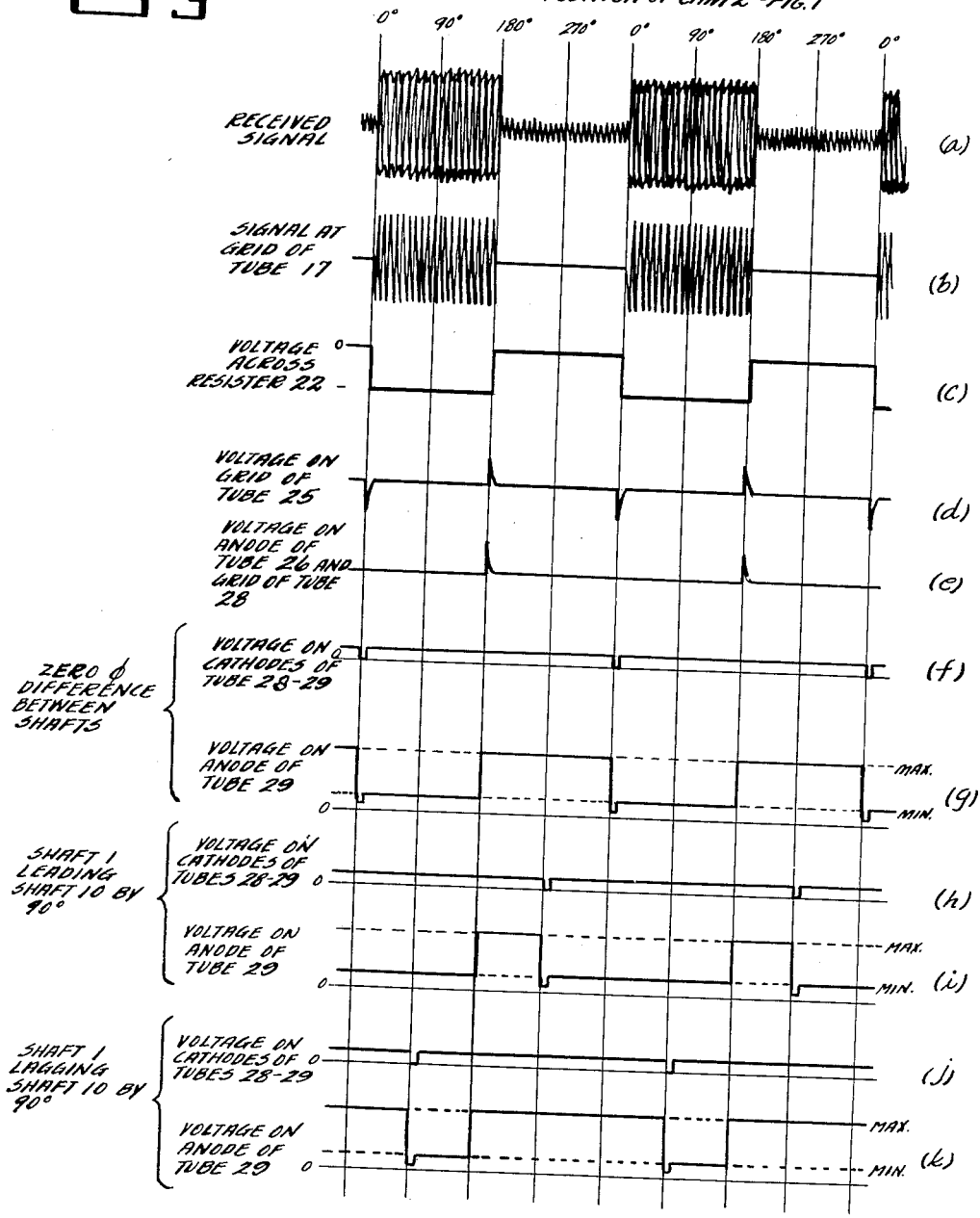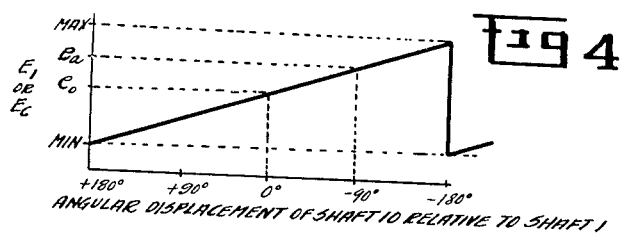

2,733,392
AUTOMATIC ROTATIONAL SYNCHRONIZATION SYSTEM

Harold M. Wright, Troy, Ohio

Application December 15, 1952, Serial No. 326,174

5 Claims. (Cl. 318—85)

(Granted under Title 35, U. S. Code (1952), sec. 266)

The invention described herein may be manufactured and used by or for the Government for governmental purposes without payment to me of any royalty thereon.

The object of this invention is to provide means for synchronizing two remotely located rotating devices in both rate of rotation and angular relationship.

Briefly the synchronization system comprises means at the master station for generating an electrical synchronizing signal at a fixed point in the rotational cycle of the master rotating element. The signal is transmitted to the slave station over any suitable transmission means where its time of occurrence is compared, in a time comparator circuit, with that of another electrical signal generated at a fixed point in the rotational cycle of the slave rotating element. The comparator circuit generates a direct voltage the amplitude of which is determined by the time difference and order of precedence of the electrical signals. A direct reference voltage, adjustable over the range of values of the comparator output voltage, is also provided at the slave station. The slave rotating element is driven by a synchronous field motor which is energized from a variable frequency oscillator. The frequency of the oscillator, and hence the speed of the motor, is varied by a servomotor controlled by a servoamplifier to which are applied the comparator output voltage and the above mentioned adjustable reference voltage. When these two voltages are equal no rotation of the servomotor occurs, however, when the reference voltage exceeds or is less than the comparator output voltage the servomotor acts to change the driving motor speed until the comparator output voltage again equals the reference voltage, thus maintaining synchronism between the two rotating elements. The relative phase of the two rotating elements may be adjusted, by changing the value of the reference voltage, so that the slave element leads or lags the master element by angles up to nearly 180°.

The synchronization system may be used wherever it is desired to synchronize remotely located rotating elements. A specific example of its use is in radar facsimile mapping equipment wherein the system may be used to synchronize the rotating stylus of a facsimile type printer located on the ground with a rotating radar antenna located on an aircraft.

A more detailed description of the synchronizing system will be given in connection with the drawings in which Fig. 1 shows the synchronizing signal generator at the master station;

Fig. 2 shows the synchronizing circuit at the slave station;

Fig. 3 shows wave forms illustrating the operation of Figs. 1 and 2; and

Fig. 4 shows the variation of the time comparator output voltage as a function of the angular displacement of the two rotating elements.

Referring to Fig. 1 which shows the master station, 1 represents a shaft rotating at constant speed and having a cam 2 attached thereto. Normally open switch 3 and normally closed switch 4 are arranged to be actuated by cam 2 and are located 180° apart with respect to the cam. Actuation of switch 3 by the cam energizes relay 5 which is then held closed by current flow through its lower contacts and normally closed switch 4. During the time that the upper contacts of relay 5 are closed keying relay 6 is energized causing transmitter 7 to radiate a continuous wave. Normally closed switch 4 is opened by cam 2 180° after closure of switch 3. Momentary opening of switch 4 breaks the holding circuit of relay 5 allowing its contacts to open. Opening of the upper contacts of relay 5 deenergizes keying relay 6 and stops radiation from the transmitter. Accordingly the wave radiated by transmitter 7, during constant speed rotation of shaft 1, is substantially as shown in Fig. 3(b).

Fig. 2 shows the remote or slave station of the synchronization system. Shaft 10 is driven through suitable gearing 11 by variable speed motor 12, which in the embodiment shown is a two-phase motor varied in speed by changing the frequency of the applied energy. The remaining portions of Fig. 2 show the means for maintaining synchronization, at a selected phase, between shaft 10 and shaft 1 of the master station.

The signal transmitted by the master station is received by receiver 13 which, in the case shown, may be either a radio frequency amplifier or the radio and intermediate frequency stages of a superheterodyne receiver. The output of receiver 13 is a high frequency wave containing noise components, as shown in Fig. 3(a). An overdriven biased amplifier 14, a resonant circuit 15 tuned to the received frequency and a biased diode 16 serve to remove most of the noise and square the envelope of the received wave, so that the voltage on the grid of cathode-follower stage 17 is as shown in Fig. 3(b). The output of stage 17, which may also be represented by the wave form of Fig. 3(b), is applied to a detecting circuit comprising diode 18 and a low-pass filter 19—20—21. The output of the detector circuit, appearing across resistor 22, is as shown in Fig. 3(c). This voltage is applied to differentiating circuit 23—24 the output of which, appearing on the grid of tube 25, is as shown in Fig. 3(d). Tube 25 is biased to cut-off and therefore does not pass the negative pulses on its grid. The positive pulses, however, form amplified negative pulses on the anode of tube 25 which are amplified again and reinverted by tube 26 to form positive pulses on the anode of this tube as shown in Fig. 3(e). Clamping diode 27 prevents the application of positive voltages to the grid of tube 26 and thereby prevents the occurrence of negative pulses on its anode.

Tubes 28 and 29 are connected in a regenerative loop to form a trigger circuit having two conditions of stability in each of which one of the tubes is conductive and the other cut off. This type circuit is commonly referred to as an Eccles-Jordan circuit. The circuit may be triggered from one condition of stability to the other condition of stability by the application of a positive pulse to the grid or a negative pulse to the cathode of the nonconductive tube of sufficient amplitude to cause conduction in the tube. The positive pulses on the anode of tube 26 are applied to the grid of tube 28 and if this tube is nonconductive when applied, operate to trigger the circuit. The cathodes of tubes 28 and 29 are normally at a positive potential relative to ground due to the space current of the conductive tube flowing through resistor 30. Momentarily grounding these cathodes, as by the action of switch 31, is the equivalent of applying a negative pulse to the cathodes and always operates to trigger the circuit by causing conduction in the nonconductive tube.

Switch 31 is closed momentarily at a fixed point in the rotational cycle of shaft 10 by cam 32. Using the axes shown in Figs. 1 and 2 as references for the angular positions of shafts 1 and 10, the condition of zero phase difference between these shafts is defined as the condition in which cam 32 passes through 0° at the same time that cam 2 passes through 0°. It will be noted from Fig. 3(e) that a positive pulse is applied to the grid of tube 28 each time cam 2 passes through 180°. If tube 28 is non-conductive at that time the pulse triggers the circuit to the condition in which tube 28 is conductive and tube 29 is cut off. Assuming the above in-phase condition of the shafts, cam 32 will pass through 0° and momentarily close switch 31 180° after the above trigger action occurs. Actuation of switch 31 lowers the cathode potential of tube 29 which causes conduction in this tube and triggers the circuit back to its original condition of stability in which tube 28 is cut off and tube 29 is conductive. A similar cycle of operation will be initiated each time cam 2 passes through 180° so that a square wave of voltage is developed at the anode of tube 29 as shown in Fig. 3(g). This voltage wave is applied through diode 33 to an integrating circuit consisting of resistor 34 and condensers 35 and 36. As a result a direct voltage $E_1$ is developed at contact 37 that is proportional to the average value of the square wave of voltage on the anode of tube 29.

If there is a phase difference between shafts 10 and 1 a voltage will be produced at contact 37 that is less than or greater than that developed for the in-phase condition by the amount of the angular displacement by which shaft 10 leads or lags shaft 1. Assuming, for example, that shaft 10 leads shaft 1 by 90°, switch 31 will be actuated 90° after the application of a positive pulse to the grid of tube 28, as indicated in Fig. 3(h), and the average value of the square wave developed at the anode of tube 29, shown in Fig. 3(i), will be reduced as compared with the in-phase condition. Graphs (j) and (k) of Fig. 3 show the results obtained when shaft 10 lags shaft 1 by 90°. The average value of the wave at the anode of tube 29 in this case is greater than that for the in-phase condition. It is apparent, therefore, that the amplitude of the voltage $E_1$ at contact 37 is directly related to the phase difference between shafts 1 and 10.

The system operates to maintain synchronization of shafts 1 and 10 at a desired phase difference, ranging from zero to nearly 180° leading or lagging, by automatically adjusting the speed of motor 12 to hold the voltage $E_1$ at contact 37 at a predetermined value. The speed controlling circuit incorporates a balanced servoamplifier comprising tubes 38 through 43 and associated circuit elements. If equal signals are applied to the grids of tubes 38 and 41, tubes 40 and 43 have equal conductivity and zero voltage is applied across the armature of direct current servomotor 44. If the voltages on the grids of tubes 38 and 41 are unequal the conductivities of tubes 40 and 43 are unequal and a voltage is developed across the armature of the servomotor proportional to the difference. The polarity of this voltage is governed by which of the two input voltages is the larger. Since motor 44 has a constant polarity on its field, a reversal of polarity at its armature terminals reverses the direction of rotation.

Motor 12, which drives shaft 10, is energized from a variable frequency source of energy comprising a free running multivibrator 45 and a frequency divider 46. The multivibrator 45 comprises tubes 47 and 48 connected in a conventional multivibrator circuit and its frequency may be adjusted and controlled by variable resistors 49 and 50. The output wave, taken from the anode of tube 48, is applied through condenser 51 and unidirectional device 52 to the cathodes of tubes 53 and 54. Condenser 51 and resistor 55 act as a differentiating circuit so that the positive going edges of the multivibrator output wave produce sharp positive pulses on the cathodes of tubes 54 and 53. There is one such pulse produced for each cycle of the output wave. There is also one negative going edge in each cycle of the output wave, however, no negative pulse is produced on the cathodes thereby due to the action of unidirectional device 52. Tubes 53 and 54 are connected in an Eccles-Jordan circuit which is triggered from one condition of stability to the other each time a positive pulse is applied to the cathodes of the tubes. Since only one positive pulse is applied during each cycle of the multivibrator and since the Eccles-Jordan circuit must be triggered twice in order to go through a complete cycle, the output wave of this circuit, taken from the anode of tube 54, has one-half the frequency of the multivibrator output wave. As an example, the multivibrator may be designed to operate at a frequency of 120 cps. which would produce a 60 cps. wave at the anode of tube 54. This rectangular wave is coupled through cathode follower stage 56 to low-pass filter 57 which passes the fundamental component only of the wave so that a 60 cps. sine wave appears at the output of the filter. This energy is applied directly to one phase of the two-phase motor 12 and through 90° phase shifter 58 to the other phase. The speed of the motor may be controlled by varying the frequency of the multivibrator through adjustment of resistor 49.

As already explained the voltage $E_1$ at contact 37 is a function of the angular displacement of shaft 10 relative to shaft 1. This function is illustrated in Fig. 4. The voltage $E_1$ is applied to the control grid of tube 38. The direct voltage $E_2$, applied to the grid of tube 41, is obtained from a potentiometer arrangement comprising resistors 59—64. The movable contact 65 on resistors 64 and the movable contact 70 on resistor 49 in the multivibrator are driven in unison by servomotor 44. The adjustment, by resistor 50, of the frequency of multivibrator 45 is such that when the two contacts are in the center of their travel the speed of shaft 10 is the same as that of shaft 1. Contacts 71 and 72 on resistors 60 and 61 are coupled for simultaneous movement in order to permit variation of the potential of the center point of resistor 64 relative to ground without varying the voltage across resistors 62—63. The potential of this center point, $E_c$, is adjustable over the range of values of $E_1$ as illustrated in Fig. 4.

The voltage $E_c$, which may be set to a selected value by contacts 71—72, establishes the desired phase relationship between shafts 10 and 1. The control system is stable when the condition $E_1=E_2=E_c$ is satisfied. If this relationship is disturbed the control system automatically operates to restore it. At the stable condition the speed of the two shafts are equal and their phase relation is that determined by the value of $E_c$, as illustrated in Fig. 4. Further, when $E_2=E_c$ the speed of the two shafts are equal since, as already stated, multivibrator 45 is initially adjusted by resistor 50 so that the speed of shaft 10 equals that of shaft 1 when contacts 65 and 70 are at the center of travel, for which condition $E_2=E_c$.

The operation of the system is as follows: Assume the two shafts to be running in synchronism with zero phase difference, as represented by the condition $$E_1=E_2=E_c=e_0$$

and the system tends to drift away from this condition such that, for example, the phase of shaft 10 relative to shaft 1 tends to change in a leading or positive direction. As seen in Fig. 4, this produces a decrease in $E_1$ which, through the action of the servoamplifier and motor, produces an equal decrease in $E_2$ and a proportionate decrease in the speed of shaft 10. Since the speed of shaft 10 is now below that of shaft 1, the positive phase difference is reduced and, as a result, $E_1$ is increased. The increase in $E_1$ is followed by an equal increase in $E_2$ and a proportionate increase in the speed of shaft 10. However, so long as shaft 10 has a positive phase angle relative to shaft 1, $E_1$ will be less than $E_c$, which equals $e_0$, and therefore $E_2$ will be less than $E_c$ and the speed of shaft 10 will be less than that of shaft 1. When the leading phase angle has been reduced to zero $E_1$ becomes equal to $e_0$ and $E_2$, which alway adjusts itself to equal $E_1$, likewise becomes equal to $e_0$. Since $E_c$ was initially set to equal $e_0$, the condition $E_1=E_2=E_c=e_0$ again exists.

The operation may be further illustrated by assuming that it is desired to change from the above condition of synchronous in-phase operation of the shafts to one in which shaft 10 has an angular displacement relative to shaft 1 of $-90°$. The contacts 71—72 are first moved to the position for which $E_c=e_a$, as illustrated in Fig. 4. This will cause $E_2$ to be much greater than $E_1$, which still equals $e_0$, and therefore servomotor 44 will operate to reduce $E_2$ and the speed of shaft 10. The initial difference between $E_2$ and $E_1$ in this case may be too great for the two voltages to be immediately equalized by the action of contact 65. In this event the contact will be moved to the bottom of resistor 64 to produce the maximum reduction in $E_2$ possible and contact 70 will likewise be moved to the lower end of its travel resulting in the maximum reduction in speed possible. The speed change produced for a given difference between voltages $E_1$ and $E_2$, and hence the sensitivity of the system, is governed by the setting of contact 73, the change in speed decreasing as the voltage across resistor 64 is increased.

The reduction in speed of shaft 10 to a value considerably below that of shaft 1 causes the phase angle of this shaft relative to shaft 1 to change in a negative direction. As a result $E_1$ begins to increase and eventually exceeds $E_2$ which then follows $E_1$ upward due to the action of the servoamplifier and motor in maintaining equality between these two voltages within the limits of potentiometer 64—65. As $E_2$ increases the speed of shaft 10 increases, however, so long as $E_1$ is less than $E_c$, which equals $e_a$, $E_2$ is likewise less than $E_c$ and the speed of shaft 10 is less than that of shaft 1. The lagging phase angle therefore continues to increase toward $-90°$ and $E_1$ continues to increase toward the value $e_a$. When $E_1$ and $E_2$ which follows $E_1$ become equal to $e_a$ the desired stable condition $E_1=E_2=E_c=e_a$ exists and shaft 10 is running in synchronism with shaft 1 with a $-90°$ angular displacement relative thereto.

When the synchronizing system is in a stable condition, such as one of those described above, there will of course always be a tendency for the system to drift one way or the other from the stable condition. The correction of these drifts by the control circuit results in a slight hunt of the angular position of shaft 10 about its desired angular position. This hunting action is damped by the slow time constant of circuit 34—35—36 in the time comparator and by the degenerative feedback circuit incorporated in the servoamplifier. The latter circuit compries a connection 74 between the anode circuit of tube 42 and the grid of tube 38, and a connection 75 between the anode circuit of tube 39 and the grid of tube 41. With this arrangement a change of potential on the grid of either tube produces a change of potential in the same direction on the grid of the other tube.

In order to disable the system in the absence of a received signal strength above a satisfactory operating level a hold circuit is provided consisting of tube 76 and relay 77 connected on its anode circuit. Signal from the output of tube 14 is applied to the grid of the tube 76 which is biased negatively by potential divider 78—79. When the signal exceeds a predetermined level as determined by the bias, relay 77 is actuated completing the armature circuit and energizing the field of direct current servomotor 44.

I claim:

1. Apparatus for synchronizing a slave rotating element with a constant speed master rotating element at a predetermined angular displacement relative to said master element, said apparatus comprising means for generating a synchronizing pulse at a point in the rotational cycle of said master element that is displaced 180° from a predetermined zero point in said cycle, an adjustable speed motor for driving said slave rotating element, means for generating a timing pulse at a predetermined zero point in the rotational cycle of said slave element, means for comparing said synchronizing and said timing pulses and for generating a first voltage that is a function of the time difference between said synchronizing pulse and said timing pulse, means for producing a second voltage adjustable over the range of values of said first voltage and serving as a reference voltage equal to the value of said first-named voltage when the speed of said master and slave rotating elements are synchronous and the angular displacement of said rotating elements is restored to the said predetermined value, and means operatively connected to the respective means for generating said first and second voltages and responsive to a difference between said first and second voltages for changing the speed of said driving motor in such direction as to reduce said difference.

2. Apparatus for synchronizing a slave rotating element with a constant speed master rotating element at a predetermined angular displacement relative to said master element, said apparatus comprising means for generating a synchronizing pulse at a point in the rotational cycle of said master element that is displaced 180° from a predetermined zero point in said cycle, an adjustable speed motor for driving said slave rotating element, means for generating a timing pulse at a predetermined zero point in the rotational cycle of said slave element, means for comparing said synchronizing and said timing pulses and for generating a first voltage that is a function of the time difference between said synchronizing pulse and said timing pulse, means for producing a second voltage adjustable over the range of values of said first voltage and serving as a reference voltage equal to the value of said first-named voltage when the speed of said master and slave rotating elements are synchronous and the angular displacement of said rotating elements is restored to the said predetermined value, means for producing a third voltage and for adjusting said third voltage over a range having a median value equal to said second voltage, means for adjusting the speed of said driving motor over a range having a median value for which the speed of said slave element equals that of said master element, means responsive to a difference between said first and third voltages and operating on said third voltage adjusting means for changing the value of said third voltage in such direction as to reduce said difference to zero, and a coupling between said third voltage adjusting means and said speed adjusting means for keeping said adjusting means at corresponding points in their respective ranges of variation.

3. Apparatus as claimed in claim 2 in which means are provided for adjusting the sensitivity of said third voltage adjusting means.

4. Apparatus as claimed in claim 3 in which said means for generating said first voltage comprises first and second amplifier tubes having their cathodes connected together and to a common cathode resistor and a direct current coupling between the anode of each tube and the grid of the other tube, means for applying said synchronizing pulse to the grid of said first tube and said timing pulse to the cathodes of said tubes, and an integrating circuit coupled to the anode of said second tube for integrating the voltage wave on said anode to produce said first voltage.

5. Apparatus as claimed in claim 4 in which said variable speed driving motor is an alternating current motor the speed of which is a function of the frequency of the energizing alternating current and in which said means for adjusting the speed of said motor comprises a variable frequency source of alternating current for said motor.

References Cited in the file of this patent

UNITED STATES PATENTS

| | | |
|---|---|---|
| 2,304,702 | Myers | Dec. 8, 1942 |
| 2,418,134 | Mitchell | Apr. 1, 1947 |
| 2,506,766 | Bartelink | May 9, 1950 |
| 2,564,439 | Marrison | Aug. 14, 1951 |